(12) United States Patent
Braithwaite et al.

(10) Patent No.: US 8,254,768 B2
(45) Date of Patent: Aug. 28, 2012

(54) SYSTEM AND METHOD FOR ILLUMINATING AND IMAGING THE IRIS OF A PERSON

(76) Inventors: Michael Braithwaite, Langhorne, PA (US); Andrew Philip Govan Date, Singapore (SG); Mohamed Nabil Moustafa, Alrehab (EG); Jason Chaikin, Springfield, NJ (US)

( * ) Notice: Subject to any disclaimer, the term of this patent is extended or adjusted under 35 U.S.C. 154(b) by 0 days.

(21) Appl. No.: 13/205,598

(22) Filed: Aug. 8, 2011

(65) Prior Publication Data
US 2012/0163783 A1 Jun. 28, 2012

Related U.S. Application Data

(60) Provisional application No. 61/425,766, filed on Dec. 22, 2010.

(51) Int. Cl.
*G06K 9/00* (2006.01)
(52) U.S. Cl. ............ 396/18; 396/62; 396/155; 348/345; 382/117; 315/241 P
(58) Field of Classification Search .................... 396/18, 396/62, 155; 348/345; 382/2, 117; 315/241
See application file for complete search history.

(56) References Cited

U.S. PATENT DOCUMENTS

| | | | | |
|---|---|---|---|---|
| 3,750,136 A * | 7/1973 | Roess | ............................. | 345/87 |
| 4,174,161 A * | 11/1979 | Mashimo et al. | ................ | 396/67 |
| 4,641,349 A * | 2/1987 | Flom et al. | .................... | 382/117 |
| 5,291,560 A * | 3/1994 | Daugman | ..................... | 382/117 |
| 5,572,596 A * | 11/1996 | Wildes et al. | ................. | 382/117 |
| 5,751,836 A * | 5/1998 | Wildes et al. | ................. | 382/117 |
| 5,867,587 A * | 2/1999 | Aboutalib et al. | ............. | 382/117 |
| 6,007,202 A * | 12/1999 | Apple et al. | ................... | 351/209 |
| 6,069,967 A * | 5/2000 | Rozmus et al. | ............... | 382/117 |
| 6,119,096 A * | 9/2000 | Mann et al. | ....................... | 705/5 |
| 6,193,373 B1 * | 2/2001 | Apple et al. | ................... | 351/221 |
| 6,334,683 B2 * | 1/2002 | Apple et al. | ................... | 351/221 |
| 6,700,998 B1 * | 3/2004 | Murata | ......................... | 382/117 |
| 6,714,665 B1 * | 3/2004 | Hanna et al. | ................. | 382/117 |
| 6,753,919 B1 * | 6/2004 | Daugman | ..................... | 348/345 |
| 6,864,473 B2 * | 3/2005 | Chretien et al. | ........... | 250/201.1 |
| 6,930,707 B2 * | 8/2005 | Bates et al. | ..................... | 348/78 |

(Continued)

OTHER PUBLICATIONS

Richard P. Wildes, Iris Recognition: An Emerging Biometric Technology, Sep. 1997, Proceedings of the IEEE, vol. 85, No. 9, All pages are pertinent.*

*Primary Examiner* — Clayton E LaBalle
*Assistant Examiner* — Kevin Butler
(74) *Attorney, Agent, or Firm* — LaMorte & Associates, P.C.

(57) ABSTRACT

A system and method for capturing an image of one or both irises. To image an iris, a person stands or moves in a target zone. A flash element provides an incoherent flash of light through an aperture. The flash is filtered to produce filtered light. The filtered light has primary wavelengths in the far red and near infrared portions of the spectrum. The filtered light is not perceived well by the human eye due to short duration, NIR color and small size. The intensity of the filtered light at the target area surpasses the intensity of all ambient light. In this manner, a person's face in the target area will always be properly illuminated, even if that person were backlit by full sunlight. An image of the person's face is taken with a camera. The image of the face is analyzed to obtain any iris pattern information.

17 Claims, 4 Drawing Sheets

U.S. PATENT DOCUMENTS

| | | | |
|---|---|---|---|
| 6,992,717 B2* | 1/2006 | Hatano | 348/333.03 |
| 7,030,571 B1* | 4/2006 | Larimer | 315/241 P |
| 7,047,418 B1* | 5/2006 | Ferren et al. | 713/186 |
| 7,095,901 B2* | 8/2006 | Lee et al. | 382/255 |
| 7,261,415 B2* | 8/2007 | Chernyak | 351/209 |
| 7,277,561 B2* | 10/2007 | Shin | 382/117 |
| 7,418,115 B2* | 8/2008 | Northcott et al. | 382/117 |
| 7,652,685 B2* | 1/2010 | Wach et al. | 348/78 |
| 7,751,598 B2* | 7/2010 | Matey et al. | 382/117 |
| 7,796,784 B2 | 9/2010 | Kondo et al. | |
| 7,925,059 B2* | 4/2011 | Hoyos et al. | 382/117 |
| 8,049,812 B2* | 11/2011 | Whillock et al. | 348/348 |
| 8,050,463 B2* | 11/2011 | Hamza | 382/115 |
| 2002/0080256 A1* | 6/2002 | Bates et al. | 348/335 |
| 2003/0020828 A1* | 1/2003 | Ooi et al. | 348/371 |
| 2006/0193501 A1* | 8/2006 | Yoo | 382/117 |
| 2006/0245623 A1* | 11/2006 | Loiacono et al. | 382/117 |
| 2007/0110285 A1* | 5/2007 | Hanna et al. | 382/117 |
| 2007/0127781 A1* | 6/2007 | Stewart | 382/110 |
| 2008/0181467 A1* | 7/2008 | Zappia | 382/117 |
| 2009/0208064 A1* | 8/2009 | Cambier | 382/110 |
| 2009/0232418 A1* | 9/2009 | Lolacono et al. | 382/312 |
| 2009/0278922 A1* | 11/2009 | Tinker et al. | 348/78 |
| 2010/0074478 A1* | 3/2010 | Hoyos et al. | 382/117 |
| 2011/0007949 A1* | 1/2011 | Hanna et al. | 382/107 |
| 2011/0102598 A1* | 5/2011 | Liang et al. | 348/164 |

* cited by examiner

SYSTEM AND METHOD FOR ILLUMINATING AND IMAGING THE IRIS OF A PERSON

RELATED APPLICATIONS

This application is a continuation-in-part of provisional patent application No. 61/425,766, filed Dec. 22, 2010.

BACKGROUND OF THE INVENTION

1. Field of the Invention

In general, the present invention relates to systems and methods that are used to identify a person using the unique pattern of that person's iris. More particularly, the present invention relates to systems and methods that illuminate a person's face and capture an image of the iris so that the image of the iris can be analyzed.

2. Prior Art Description

The iris is the colored portion of the eye that surrounds the pupil. Upon close inspection, it can be seen that the iris is not a single monochromatic color. Rather, the iris has a complex pattern of overlapping colors, lines, and speckles that extend throughout the iris. It is well known that the iris pattern of any one individual is as unique to that individual as his/her fingerprints. Consequently, it is highly improbable that any two individuals in the world would share the same iris pattern.

Since the iris pattern of an individual is such a good biometric identifier, there have been many prior art systems developed to image the iris of an individual and use that image for identification purposes. Such prior art system are exemplified by U.S. Pat. No. 5,291,560 to Daugman, entitled, Biometric Personal Identification System Based On Iris Analysis; U.S. Pat. No. 7,277,561 to Shin, entitled Iris Identification; and U.S. Pat. No. 7,796,784 to Kondo, entitled Personal Authentication Method For Certicating Iris. In all such prior art systems, a clear image of the iris is required. That can present a problem, in that obtaining a clear image of a person's iris in the real world is very difficult.

The largest problem associated with obtaining a clear image of the iris is one of proper illumination. In order to obtain a clear and reliable image of a person's iris, the iris must be illuminated with light that is brighter than that of the ambient background light, else corneal reflections and/or shade regions contaminate the iris pattern being imaged. However, background full spectrum sunlight can sometimes be as bright as 100 mW/cm². In order to overcome this level of background light, a face must be illuminated with such an intense flash that the person would be momentarily blinded or the person would experience at least some physical discomfort from the light's intensity. Furthermore, repeatedly illuminating the same person with such an intense light may result in some retinal damage.

One solution tried to solve the problem of iris illumination is to illuminate the iris with infrared light instead of white light. The human eye is less sensitive to infrared light than other shorter wavelengths of visible light. In the prior art, infrared light is typically created with infrared LEDs, due to the commercial availability of these LEDs. However, a very large matrix of infrared LEDs would have to be used in order to surpass the infrared light contained in background sunlight. Furthermore, although the eye is far less sensitive to such infrared light, the use of infrared light greatly reduces the contrasts of the iris pattern when the iris is imaged. This is due to the fact that light produced by commercial LEDs is generally very narrowband, if not monochromatic. The small bandwidth of wavelengths being produced makes it more difficult to detect finely detailed patterns in the iris, which the uniqueness being sought. Since most of the iris pattern contains subtle details, a lot of pattern information is lost. Therefore, although the iris may be illuminated by LED light, the image obtained lacks much of the contrast detail needed for many iris pattern identification algorithms to function to its full potential over a wide variation of iris tissues and associated reflectance properties.

Another problem associated with aggressive iris illumination is one of specularities. Specularities are the areas of the eye or eyeglasses that reflect the illuminating light back into the camera and cause an image saturation and obscuration of the iris. The reflected light appears as a white area in the captured image, wherein no iris pattern information can be obtained. Specularities occur with the naked eye from the cornea. However, these small corneal specularities rarely obscure the entire image of the iris. However, if the person being imaged is wearing eyeglasses, then the eyeglasses may act as mirrors, depending upon the angle of the eyeglasses. This can produce larger specularities that make a significant portion of captured iris image unreadable, which impacts overall system performance.

The obvious solution to the above-identified problems is to eliminate background illumination and specularities by making a person remove his/her glasses and place his/her face directly in front of a scanner. In this manner, a person's face occupies most of the scanned image and blocks out background light. This close-proximity scan eliminates most background lighting problems and most specularities. Although close proximity scanners may be appropriate for certain applications, such as access through high security doors, such scanners have little practical use in public areas, such as airports, train stations or the like. Nor are close proximity scanners practical for outdoor environments where bright sunlight is prevalent. Likewise, close proximity scanners have no applications in passive monitoring of crowds, wherein people do not stop to be scanned but, rather, are automatically scanned as they pass a certain point.

In order to a scanner to passively monitor a crowd, the imaging camera must be focuses at some point within the crowd or an autofocusing system must be utilized. In order to achieve higher device reliability, smaller form factors, and reduced costs, the imaging lens system must have an illumination system sufficient for the depth of field or static capture zone depth. The high level of illumination is compatible with the higher lens F# and produces a deeper static capture zone without an autofocusing system. Different static capture zone designs are achieved by using a different lenses designed to achieve various capture zone distances from several inches to beyond ten meters. At capture zone distances beyond ten meters, the greater depth of field from the high F# reduces the requirements of the autofocusing system by providing a more favorable depth of field. It has proven difficult in the prior art to provide sufficient illumination throughout such an extended range without making the illumination flash either highly obvious or potentially harmful.

A need therefore exists for a system and method, whereby an image of an iris can be obtained regardless of worst-case ambient lighting conditions. A need also exists for a system and method of obtaining an iris image without requiring a person to remove his/her eyeglasses. A further need exists for a system and method that can reliably scan a person's iris from at distances few inches to ten meters with adequate illumination, therein eliminating the need for a person to stand in close proximity to a scanner. Lastly, a need exists for a system that illuminates the iris in a manner that is not obvious to the person being scanned, optically annoying, and/or potentially harmful. These needs are met by the present invention as described and claimed below.

SUMMARY OF THE INVENTION

The present invention is a system and method for capturing an image of a person's iris in one or both or that person's eyes. The image of each iris can then be used for biometric identification. To image a person's iris, a person stands or moves through a target zone. That target zone can be close to a scanning system, as far as ten meters away from the scanning system, or at any intermediate zone in between. The person being scanned may or may not know that he/she is being scanned.

A flash element is provided at a first position. The flash element provides a wide spectrum flash of light when activated. The flash of light created by the flash element projects through an optical pass filter to produce filtered light. The filtered light has primary wavelengths of over 720 nm and preferably over 740 nm. The filtered light is in the far red and near infrared portions of the spectrum. However, since the light is generated by a wide spectrum flash of white light, the filtered light remains incoherent above the wavelength threshold of the optical pass filter.

The initial flash that creates the light is short, having a duration of between 40 microseconds and 3 milliseconds. Furthermore, the perceived size of the flash point is controlled by passing the light through a small aperture. The short duration of the flash, the small perceived flash point, and the filtered wavelengths of the light all combine to make the light nearly unperceivable to the human eye. Accordingly, a person may not realize that the flash illumination has occurred.

The intensity of the flashed illumination at the target area surpasses the intensity of all full spectrum ambient white light. In this manner, a person's face and eyes in the target area will always be properly illuminated for imaging, even if that person were standing in direct sunlight or mixed with full sun and shade. Furthermore, the undesirable corneal reflection patterns from ambient light are nulled out. The intensity of the flashed filtered light is offset by its poor visual perception. In this manner, high intensity, short duration, and small area flashes do not result in the discomfort of the person being scanned.

With the face of a person properly illuminated, an image of the person's face and eyes is taken with a camera that has good quantum efficiency in the filter light wavelengths being used. The image of the face are eyes is analyzed to obtain any iris pattern information that image may hold.

The wavelengths of the filtered light and its method of production produces light that is hard to perceive, yet produces images having a high degree of iris pattern contrast. Further, the filtered light reduces specularities so that iris pattern information can even be obtained from people wearing eyeglasses. The result is an improved system and method of illuminating a person's face and eyes in order to enable better images to be obtained leading to improved system performance.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention iris imaging system can be embodied in many ways, the present invention system is particularly well suited for passive identification systems where people are imaged at distances of between a few centimeters and ten meters from the camera. The first embodiment illustrated shows the preferred embodiment of the iris imaging system being used to passively scan people who are passing through an intermediate scan zone of between 0.5 meters and four meters from the camera unit. The alternate second embodiment illustrated shows the iris imaging system set up for a distant scan zone of over four meters from the camera unit. The alternate third embodiment illustrated shows the iris imaging system set up for a more traditional close proximity scan zone of under 0.5 meters. These embodiments are selected in order to set forth some of the best modes contemplated for the invention. The illustrated embodiments, however, are merely exemplary and should not be considered a limitation when interpreting the scope of the appended claims.

Figure 1:
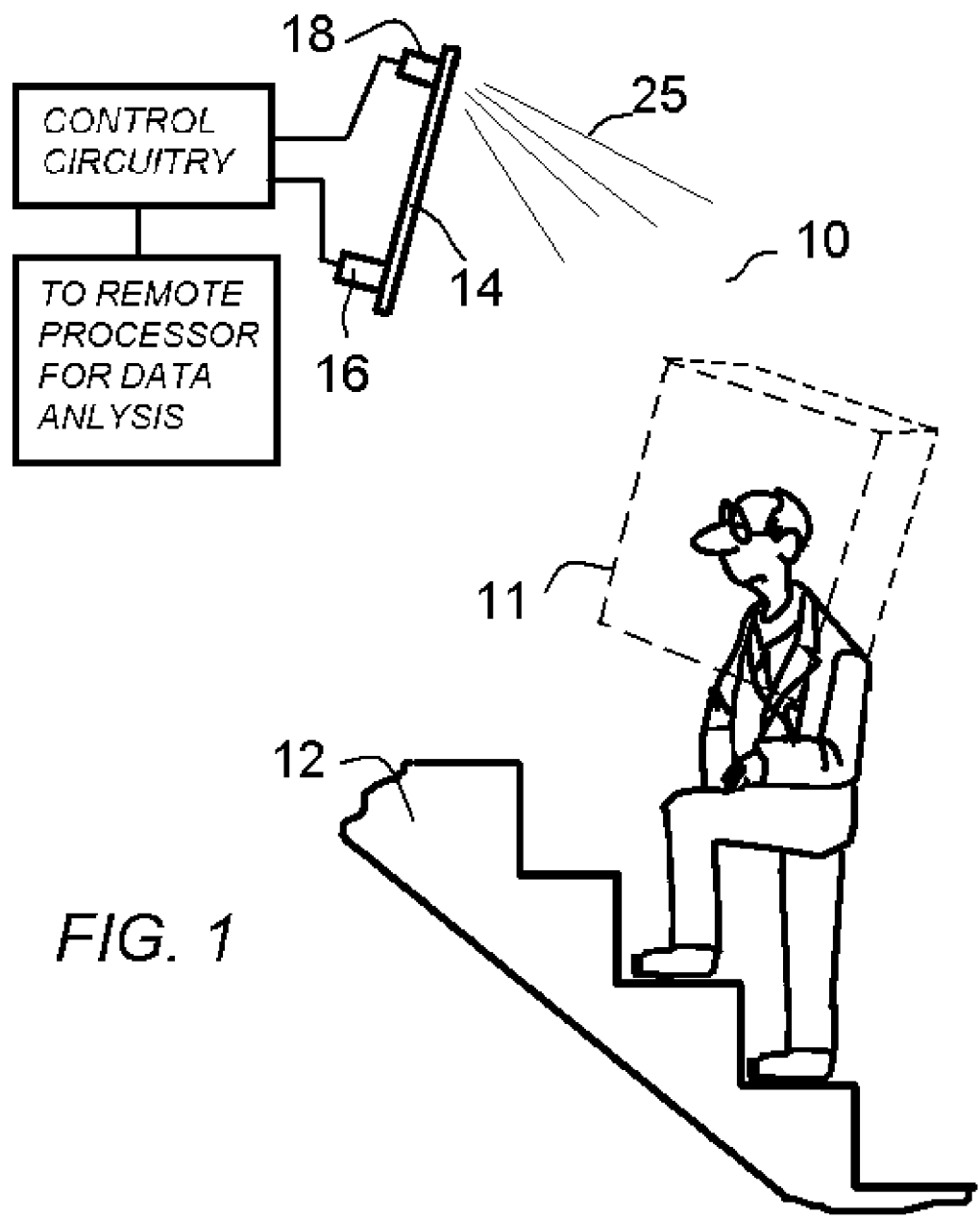
FIG. 1 is schematic showing an exemplary embodiment of the present invention iris imaging system passively scanning people that pass through a target area.

Referring to FIG. 1, a schematic of the exemplary iris imaging system 10 is illustrated. The iris imaging system 10 is used to passively capture the image of a person's iris, or irises, as that person passes a particular target zone 11. The system can be used in airplane loading platforms, walkways, staircases, escalators, and similar locations where people tend to travel in a set direction. In the exemplary embodiment being shown, the system 10 is positioned above an upwardly traveling escalator 12. On such escalators, people tend to stand still. Furthermore, people tend to travel in single file and often look upwardly as they progress up the escalator 12. Consequently, the position of the passing people is ideal for a successful passive iris scan.

The present invention iris imaging system 10 can be a stand-alone device. Additionally, the system 10 can be disguised. In the exemplary embodiment of the system 10 being illustrated, a sign 14 is hung over the escalator 12. The sign 14 can be a simple advertisement sign, an illuminated sign, or an electronic display. Regardless, it will be understood that a person traveling up the escalator 12 will likely gaze toward the sign 14. Hidden within the sign 14 are both a camera unit 16 and an illumination unit 18. The camera unit 16 and the illumination unit 18 are positioned at two different points in the sign 14. There is preferred spacing between the camera unit 16 and the illumination unit 18 is at least twelve degrees apart as measured from the center of the scan zone 11 to reduce the occurrences of reflective specularities in the image recorded by the camera unit 16. The greater the separation between the camera position and the illuminator, the less specularities occur. Beyond twelve degrees of separation as viewed from the person's position, specularities no longer occur for all gaze directions from the camera line of sight and all angles away from the illuminator's side. The illumination unit 18 flash illuminates the person's face in a manner that creates a clear image of one or both irises. As will be explained, the flash created by the illumination unit 18 will be barely noticed and perhaps even unnoticed by the person being scanned. This is especially true if the sign 18 is an illuminated sign, an electronic display that emits light, or a shiny reflective surface that disguises the flash.

The camera unit 16 records an image of the person's eyes at the moment of the flash illumination. The image collected is of a high enough quality to obtain accurate iris pattern information, even if a significant distance exists between the person and the camera unit 16.

Figure 2:
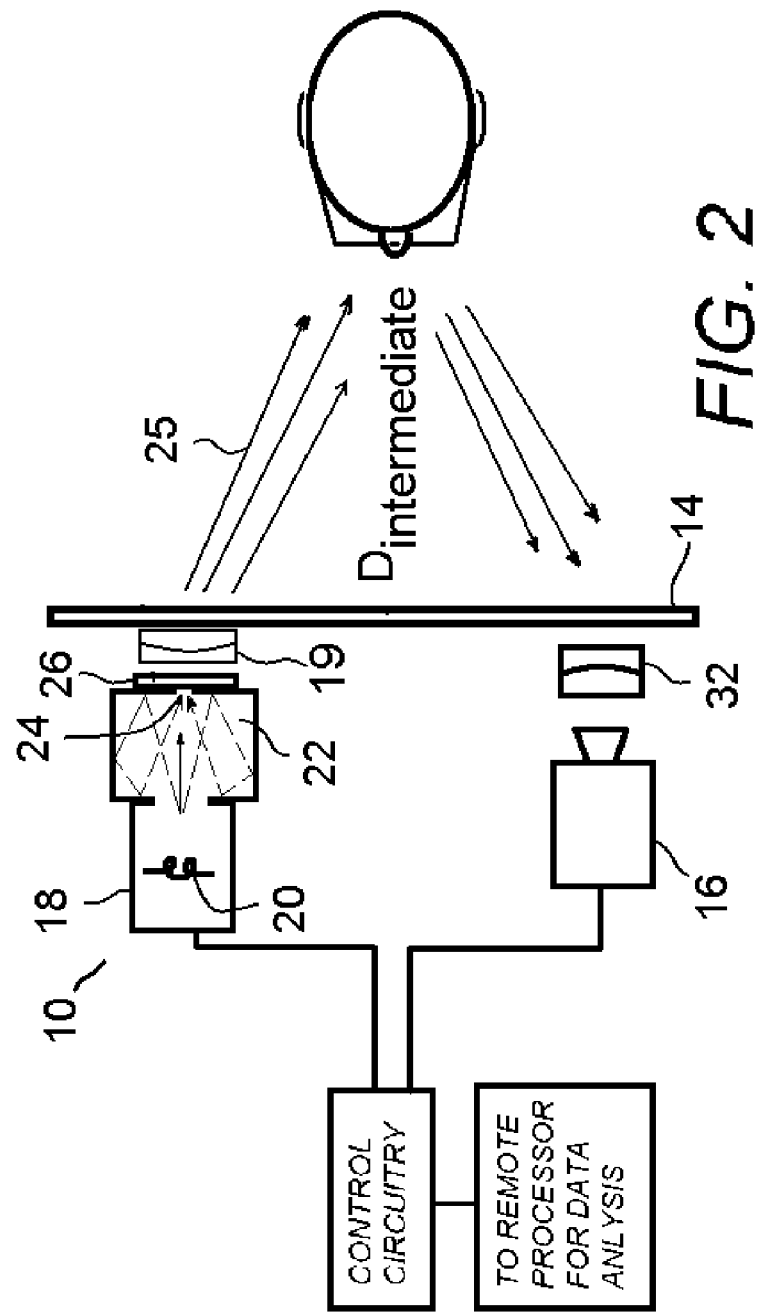
FIG. 2 is a schematic illustrating the electro-optical components of the exemplary iris imaging system.

Referring to FIG. 2 in conjunction with FIG. 1, the method of operation for the iris imaging system 10 can now be explained. The illumination unit 18 contains a flash element 20, such as a flashtube, strobe light flash, or other electric glow discharge lamp. The flash element 20 creates a highly intense wide spectrum flash of light for a short duration when activated. The flash element 20 is disposed within a reflective flash chamber 22. The light of the flash reflects between the mirrored inboard surfaces of the flash chamber 22 until the light reaches an exit aperture 24. Accordingly, the flash chamber 22 acts as an optical spherical integrator to the flashed light. This means that light exiting the aperture 24 is multiphase, being that some light bounces around the reflective flash chamber 22 longer than other light before exiting the aperture 24. This increases the incoherency of the exiting light.

The exit aperture 24 is small, having an area of between one square millimeter and one square centimeter. The area of the aperture 24 is directly proportional to the distance of the target area 11 from the illumination unit 18. If the target area 11 is close to the illumination unit 18, then less light is needed and the exit aperture 24 is small. Conversely, if the target area 11 is further way from the illumination unit 18, more light is needed and the exit aperture 24 is larger.

As the flashed light exits the aperture 24, it becomes confined into a diverging beam 25 by one or more focusing lenses 19. The focusing lenses 19 direct the diverging beam 25 to illuminate the area of the target zone 11. The beam 25 is optically filtered using a near-infrared pass filter 26. The pass filter 26 is positioned after the exit aperture 24. Accordingly, the light beam 25 passing through the exit aperture 24 becomes filtered. The pass filter 26 enables only light in some selected portion of the red to near-infrared portions of the spectrum to pass. The preferred range is between 720 nm and 950 nm. Other wavelengths of light in the green, blue, and violet portion of the spectrum are substantially suppressed. The intensity of the filtered light beam 25 passing out of the aperture 24 is dependent upon multiple factors. These factors include the power of the flash element 20, the wavelength absorption characteristics of the pass filter 26, and the size of the exit aperture 24. These factors are engineered so that the intensity of the beam 25 in the selected pass filter wavelength range surpasses that of ambient sunlight when reaching the target zone 11, yet minimizes both specularity size and impact, and human perception of the flash. It will therefore be understood that if a person were to stand or move within the emitted beam 25 when the flash element 20 flashes, that person will be bathed in filtered light that surpasses that of sunlight within the filtered spectral range for the duration of the flash.

The human eye is most sensitive to green light. The human eye's sensitivity to reddish light peaks at approximately 558 nm, which is near the green-yellow region of the spectrum. The sensitivity of the eye to wavelengths above 558 nm falls away dramatically. In the selected near-infrared portion of the spectrum, i.e. 720 nm to 950 nm, the sensitivity of the human eye is a small fraction of its peak. As a consequence, a flash of light filtered to the near-infrared is not easily perceived by the human eye. Accordingly, even if that flash were intense, it would not cause visual discomfort. The low eye responsivity to the spectral band is also coupled to very short duration flash, i.e. from 400 microseconds to 3 milliseconds, and a small emitted area of the aperture 24. The combination of these three attributes yields a very low human perception of intense light when the gaze direction is directly at the exit aperture 24 and yet overcomes the ambient light challenge completely.

It will therefore be understood that a person can be flashed with filtered near-infrared light with an intensity greater than the intensity of natural sunlight at that spectral range and the person being illuminated would have little perception of the flash. If the illumination unit 18 was hidden in or near an illuminated sign or electronic display that emits light throughout the spectrum, it is probable that a person would not even perceive the flash of near-infrared light due to the wash of other more visible light. If the flash were positioned off axis by more than five degrees to the person's gaze direction, the flash is likely not perceived regardless of being hidden or disguised as human eye acuity substantially reduces a few degrees away from the gaze direction.

The camera unit 16 contains an imaging camera 30 and an objective lens assembly 32. The imaging camera 30 can be a traditional commercial camera with good sensitivity to near infrared light or a specialized camera designed to have such sensitivity. As has been previously stated in this specification, infrared LEDs that produce monochromatic light cause the contrast of the iris pattern in the eye to diminish significantly. This is due in part to the long wavelength of the light, and due in part to the uniformity of the light. However, filtered near-infrared light from a full spectrum flash element significantly preserves the iris contrast in the collected image. This is because the near-infrared light has shorter wavelengths, the light has a broader spectral range, and the light is incoherent with many phase variations created by the flash chamber 22.

In the exemplary embodiment, the camera unit 30 is positioned a predetermined distance from the target zone 11 when the illumination unit 18 is activated. The target zone 11 can be up to ten meters from the camera unit 30 without requiring an autofocusing mechanism.

In the exemplary embodiment being illustrated, a person is being scanned as they ride an escalator 12. In this scenario, the scan can take place when the person's face is within the target zone 11 at a fixed distance from the camera unit 16 determined by the camera lens magnification. The objective lens assembly 32 used in front of the imaging camera 30 can be focused at this known distance. For example, suppose an average sized person will pass within one meter of the sign 14 as he/she rides up the escalator 12. The objective lens 32 can be focused at this distance. Accordingly, the objective lens assembly 32 may produce a confined field of view that matches the target zone 11. A preferred field of view is between five and fifteen thousand square centimeters, with approximately eleven thousand square centimeters being preferred.

Since the field of view is only about eleven thousand square centimeters, the illumination unit 18 need only illuminate the portions of the target zone 11 that correspond with the field of view, i.e. eleven thousand square centimeters. The aperture 24 within the illumination unit 18 can be used to match the area of illumination to the camera's field of view. In this manner, energy does not have to be wasted illuminating areas where the camera unit 16 is not aimed and focused.

Although the illumination unit 18 and the camera unit 16 are directed toward the same target area 11, the camera unit 16 and the illumination unit 18 are not necessarily positioned together. Rather, it is preferred that the illumination unit 18 and the camera unit 16 be separated by at least a few centimeters to minimize the probability of specularities. By separation, the light produced by the illumination unit 18 impinges upon the target zone 11 at an angle that is different from the angle the camera unit 16 makes with the target zone 11. The difference in angle further reduces the probability of formation of specularities in the collected image.

In operation, the camera unit 16 and the illumination unit 18 are directed toward the same target area 11. As is illustrated, the placement of the camera unit 16 and the illumination unit 18 in a sign or display is ideal because it directs a person's eyes toward the camera unit 16 and it hides the flash of the illumination unit 18.

As the face of a person passes into the target zone 11, or at some regular time interval, the illumination unit 18 activates. The flash element 20 flashes. The flash passes through the pass filter 26 and the aperture 24. The filtered beam 25 then bathes the target area 11 with near-infrared light that is brighter than all background light.

At the moment the target zone 11 is illuminated, the imaging camera 30 takes a picture of the target zone 11. If the collected image contains a clear image of one or more of a person's irises, the iris pattern can be isolated in the image analyzed using known iris pattern identification algorithms.

As has been explained, the present invention iris identification system 10 is especially well suited for obtaining iris information passively at some intermediate distance. Small changes can be made in the system to adapt the system for long range scans or close proximity scans.

Figure 3:
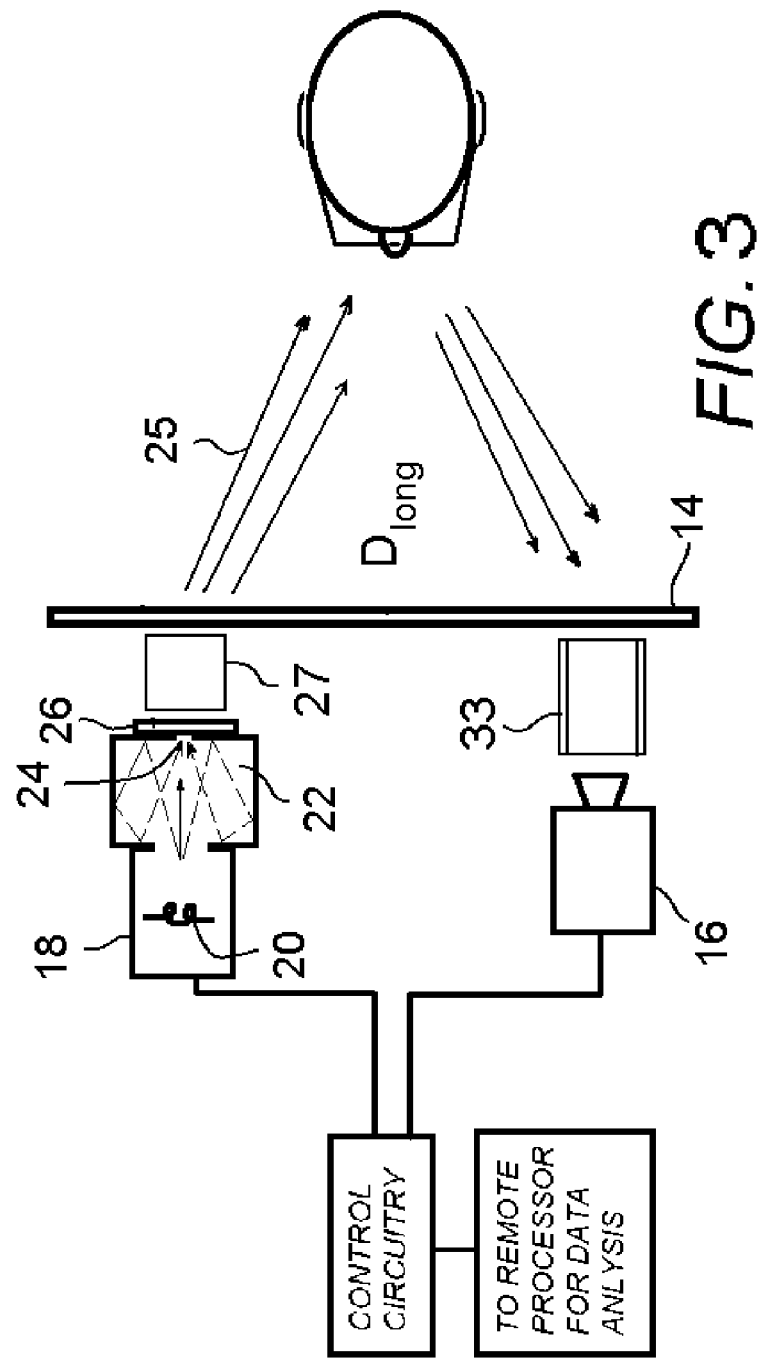
FIG. 3 is a schematic showing an alternate embodiment of the present invention iris imaging system configured for a long range scan; and and FIG. 4 is a schematic showing an alternate embodiment of the present invention iris imaging system configured to a close proximity scan.

Referring now to FIG. 3, the system is configured for a long range scan. For a long range scan, the illumination unit must provide bright illumination at a distance that can surpass ten meters. To provide such illumination at a distance, the beam of filtered light 25 produced by the illumination unit 18 is passed through a collimator lens assembly 27. The collimator lens assembly 27 confines the beam 25 so that the beam 25 is directed into the distant target area without spill into the surrounding areas.

Furthermore, for imaging target areas at long distances, the objective lenses of the earlier embodiment can be replaced with an autofocusing lens assembly 33.

Figure 4:
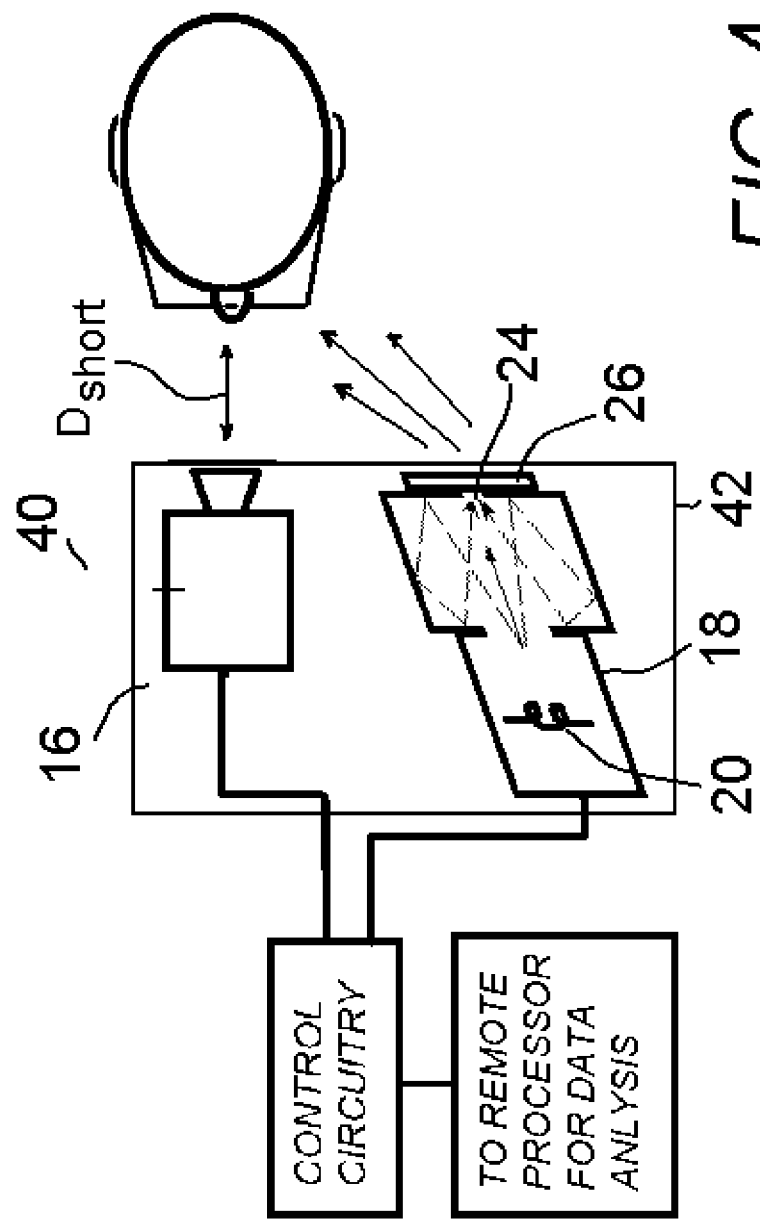

The advantages specified for the present invention can also be utilized in a near scan application. Referring now to FIG. 4, a near scan application for the iris imaging system 40 is shown. In this scenario, a person knows he/she is being scanned and cooperates in order to be properly identified.

In this system, a person stands a predetermined distance from a scanner unit 42 and stares at the scanner unit 42 for the purpose of a scan. The distance is typically less than 50 centimeters. The scanner unit 42 can be affixed to a wall or door. However, the scanner unit can also be a handheld mobile unit.

The scanner unit 42 contains the same components as the system of the first embodiment. Accordingly, the same reference numbers will be used to identify the same components.

In this close scan scenario, an illumination unit 18 is provided that contains a flash element 20. The flash element 20 used in the illumination unit 18 can be much smaller than previously described. In fact, a simple small xenon flash bulb makes a good flash element. Such flash bulbs have an area only slightly larger than a penny and are typically used in small inexpensive cameras.

The flash from the flash element 20 is filtered to the desired near-infrared portion of the spectrum utilizing a pass filter 26. A flash chamber 22 and aperture 24 may be used to add phase complexities to the light. Due to the close nature of the scan, a very small aperture 24 can be used. Likewise, no focusing lens assembly is needed to confine the beam 25.

The filtered light is used to illuminate the target area of the person's face. Since the filtered light is near-infrared, short duration and small, it is not readily perceived by the human eye. Accordingly, the flash can be quite intense without causing discomfort to the person looking at the flash. At the moment of the flash, an image is collected and is analyzed for its iris information.

In a close scan application, the illumination unit 18 may be within centimeters of the camera unit 16. However, due to the use of very small aperture 24, specularity sizes are reduced thus increasing system performance. Most images can be successfully obtained without having the person being scanned remove their eyeglasses.

In all exemplary embodiments, the near-infrared light is created using a wide spectrum flash element that is filtered to the near-infrared spectral range. This ensures that light is incoherent throughout the near-infrared spectral band and not coherent or very narrow band as would occur with a NIR laser or IR-LEDs. The near-infrared light is broadband in the filter range. This broader band of light is needed in order to obtain good contrast in the iris pattern over a wide population of iris tissue reflectance variance. Furthermore, by using filtered flashed light, the numerous regulations regarding laser light or narrower band light use can be minimized since higher intensity thresholds apply to broadband illuminators.

It will be understood that the embodiments of the present invention that are illustrated and described are merely exemplary and that a person skilled in the art can make many variations to those embodiments. For instance, many different pass filters exist that can be used in the present invention. Likewise, any flash elements that are capable of producing a wide spectrum flash in the intensity ranges needed can be used. All such embodiments are intended to be included within the scope of the present invention as defined by the claims.

What is claimed is:

1. A method of capturing an image of a person's iris, comprising the steps of:
    providing a flash element that provides a flash of light when activated;
    integrating said flash of light in a refection chamber, wherein said flash of light exits said reflection chamber through an exit aperture;
    filtering said flash of light to produce filtered light having primary wavelengths over 720 nm;
    directing said filtered light toward a predetermined target zone;
    providing a camera that is directed toward said target zone wherein said camera is positioned offset from said flash element by at least twelve degrees as measured from said target zone;
    activating said flash element when a person is in said target zone, wherein said filtered light illuminates at least one iris; and
    recording an image of at least one iris with said camera.

2. The method according to claim 1, wherein said step of activating said flash element results in a flash of light having a duration of between 40 microseconds and 3 milliseconds.

3. The method according to claim 1, wherein said aperture has an area of between one square millimeter and one square centimeter.

4. The method according to claim 1, further including the step of confining said filtered light into a narrow beam of light that illuminates said target zone.

5. The method according to claim 1, wherein said step of confining said filtered light includes shining said filtered light through at least one focusing lens.

6. The method according to claim 1, wherein said step of filtering said flash of light includes passing said flash of light through a optical pass filter.

7. The method according to claim 6, further including the step of proving an optical focusing element that focuses said camera on said target zone.

8. The method according to claim 1, further including the step of providing an illuminated display, wherein said camera and said flash element are mounted proximate said illuminated display.

9. A method of imaging a person's iris, comprising the steps of:
providing a flash chamber having a restricted exit aperture, wherein said restricted exit aperture has an area of between one square millimeter and one square centimeter;
flashing a flash element within said flash chamber that produces incoherent light, wherein said incoherent light exits said flash chamber through said restricted exit aperture;
filtering said incoherent light to have primary wavelengths over 720 nm;
directing said incoherent light toward a predetermined target zone;
providing a camera, wherein said camera is directed toward said target zone and wherein said camera captures light in said primary wavelengths of said incoherent light;
activating said light source when at least one iris is in said target area, wherein said incoherent light illuminates said at least one iris; and
recording an image of said at least one iris with said camera.

10. The method according to claim 9, further including the step of creating phase variations in said incoherent light.

11. The method according to claim 9, wherein said flash of incoherent light has a flash duration of between 40 microseconds and 3 milliseconds.

12. The method according to claim 9, wherein said step of filtering said incoherent light includes directing said incoherent light through a pass filter that primarily passes light over 740 nm.

13. The method according to claim 12, further including the step of focusing said incoherent light on said target area.

14. In an environment having background ambient light, a method of illuminating an iris for imaging, comprising the steps of:
providing a flash element that produces a flash of incoherent light when activated;
passing said flash of incoherent light though a restricted aperture, wherein said aperture has an area less than one square centimeter;
filtering said flash of incoherent light to produce a filtered light flash having primary wavelengths over 720 nm; and
directing said filtered light flash toward the iris to illuminate said iris with an intensity greater than that of said background ambient light.

15. The method according to claim 14, further including the step of generating phase variations in said flash of light.

16. The method according to claim 14, further including the step of limiting said flash of light to a flash duration of between 40 microseconds and 3 milliseconds.

17. A method of capturing an image of a person's iris, comprising the steps of:
providing a flash element that provides a flash of light when activated;
integrating said flash of light in a refection chamber, wherein said flash of light exits said reflection chamber through an exit aperture;
filtering said flash of light to produce filtered light having primary wavelengths over 720 nm;
directing said filtered light toward a predetermined target zone;
providing a camera that is directed toward said target zone;
providing an illuminated display, wherein said camera and said flash element are mounted proximate said illuminated display;
activating said flash element when a person is in said target zone proximate said illuminated display, wherein said filtered light illuminates at least one iris; and
recording an image of at least one iris with said camera.

* * * * *